US011949359B2

(12) United States Patent
Kammerer et al.

(10) Patent No.: US 11,949,359 B2
(45) Date of Patent: Apr. 2, 2024

(54) SYSTEMS AND METHODS FOR ACQUIRING THE OPERATING PARAMETER DATA OF A MOTOR SYSTEM WITH ELECTRIC MOTOR AND CORRESPONDING MOTOR SYSTEM (71) Applicant: ZIEHL-ABEGG SE, Künzelsau (DE)

(72) Inventors: Matthias Carsten Kammerer, Kupferzell (DE); Bjoern Wenger, Schrozberg (DE)

(73) Assignee: ZIEHL-ABEGG SE, Künzelsau (DE)

( * ) Notice: Subject to any disclaimer, the term of this patent is extended or adjusted under 35 U.S.C. 154(b) by 547 days.

(21) Appl. No.: 17/261,544

(22) PCT Filed: May 29, 2019

(86) PCT No.: PCT/DE2019/200053
§ 371 (c)(1),
(2) Date: Jan. 19, 2021

(87) PCT Pub. No.: WO2020/015795
PCT Pub. Date: Jan. 23, 2020

(65) Prior Publication Data
US 2021/0257955 A1    Aug. 19, 2021

(30) Foreign Application Priority Data
Jul. 17, 2018    (DE) .................... 10 2018 211 882.5

(51) Int. Cl.
H02P 29/024    (2016.01)
G05B 23/02    (2006.01)
(52) U.S. Cl.
CPC ........ H02P 29/024 (2013.01); G05B 23/0264 (2013.01); G05B 23/0281 (2013.01)

(58) Field of Classification Search
CPC ............... H02P 29/024; H02P 21/0021; G05B 23/0264; G05B 23/0275; G05B 23/0281
See application file for complete search history.

(56) References Cited

U.S. PATENT DOCUMENTS 7,298,110 B2 * 11/2007 Lindsey ................. H02K 11/33
318/495
7,602,132 B2 * 10/2009 Davis .................. H02P 23/0077
318/565

(Continued)

FOREIGN PATENT DOCUMENTS

CN    1226329    8/1999
CN    1344942    4/2002

(Continued)

Primary Examiner — Thai T Dinh
(74) Attorney, Agent, or Firm — FisherBroyles, LLP; Jason P. Mueller (57) ABSTRACT Disclosed embodiments include a system and method of acquiring operating parameter data of a motor system that includes an electric motor. The motor system may be provided as a component of a fan. An embodiment includes recording states of operating parameters during operation of the motor system, wherein the operating parameters include a basic parameter and at least one additional parameter; determining a state-change event of the basic parameter based on a recorded state of the basic parameter; recording a state of the additional parameter upon detection of the state-change event of the basic parameter; linking the recorded state of the additional parameter to the detected state-change event; and storing the recorded state of the additional parameter linked to the detected state-change event.

15 Claims, 5 Drawing Sheets (56) References Cited

U.S. PATENT DOCUMENTS

| | | | | |
|---|---|---|---|---|
| 7,675,257 | B2* | 3/2010 | Beifus | H02P 29/0241 |
| | | | | 700/204 |
| 8,314,576 | B2* | 11/2012 | Fahimi | H02P 21/141 |
| | | | | 318/400.04 |
| 10,069,451 | B2* | 9/2018 | Beifus | G05B 23/0264 |
| 2006/0208673 | A1* | 9/2006 | Kling | H02P 1/56 |
| | | | | 318/66 |
| 2017/0187318 | A1* | 6/2017 | Beifus | H02P 6/34 |

FOREIGN PATENT DOCUMENTS

| | | |
|---|---|---|
| CN | 1781241 | 5/2006 |
| CN | 101087036 | 12/2007 |
| CN | 101192808 | 6/2008 |
| CN | 101334667 | 12/2008 |
| CN | 101394144 | 3/2009 |
| CN | 101796587 | 8/2010 |
| CN | 103107756 | 5/2013 |
| CN | 104205200 | 12/2014 |
| CN | 107359586 | 11/2017 |
| CN | 107592958 | 1/2018 |
| DE | 102016108506 B3 | 9/2017 |
| EP | 1967930 A2 | 9/2008 |
| JP | 2006101576 A | 4/2006 |
| JP | 2007282494 | 10/2007 |
| WO | 2004079889 A1 | 9/2004 |

* cited by examiner

SYSTEMS AND METHODS FOR ACQUIRING THE OPERATING PARAMETER DATA OF A MOTOR SYSTEM WITH ELECTRIC MOTOR AND CORRESPONDING MOTOR SYSTEM

This application is a national stage entry under 35 U.S.C. 371 of PCT Patent Application No. PCT/DE2019/200053, filed May 29, 2019, which claims priority to German Patent Application No. 10 2018 211 882.5, filed Jul. 17, 2018, the entire contents of each of which are incorporated herein by reference.

This disclosure relates to a method for acquiring the operating parameter data of a motor system with an electric motor. The motor system may be provided as a component for a fan.

This disclosure also relates to a motor system for acquiring operating parameter data.

Finally, this disclosure relates to a fan with a corresponding motor system.

The term "motor system" is to be understood in the broadest sense. The teaching of this disclosure can be applied, for example, to an electric motor, to the arrangement of several electric motors, to electric motor groups, or to several electric motor systems. The motor system may include a control system having a processor and memory.

In practice, it is always important to estimate and/or determine the remaining service life of a component or an assembly of a motor system and/or an electric motor. Reference is made to DE 10 2016 122 404 A1, which relates to the determination of rotor fatigue in the assembly of an electric motor, as an example.

Determining the remaining service life of a component or assembly is important if a failure would lead to consequential damage, as is the case, for example, in thermally critical applications. If, for example, the cooling system or a part thereof fails in a server room, this can lead to overheating and operational failure or even the destruction of servers and other hardware. The cooling of other complex and/or expensive electronic systems is similarly critical. In such application scenarios, it is helpful if an impending failure is indicated at an early stage so that the component threatened by the failure can optionally be replaced well before the failure. Furthermore, in this respect, it is also relevant if at least an evaluation and analysis of operating parameter data can be carried out in the event of a malfunction or in the aftermath of a damage event in order to allow the cause to be found.

In the case of converters such as those used to actuate electric motors, for example EC (Electronically Commutated) motors, there are several components and assemblies that limit the service life. Most of the time, semiconductors (mainly in the end stage or in optocouplers) and capacitors (mainly in electrolytic capacitors in the intermediate circuit or in switched-mode power supplies) are most at risk of failure. Capacitors, for example, are subject to strong temperature-dependent and load-current-dependent aging, which is why their service life can vary greatly.

In practice, electric motors are used extensively in the context of fans, including everything from miniature drives and servomotors to high-performance drives. Like many mechanically moved devices, electric motors are also subject to (mechanical) wear. In the case of electric motors with a slip ring, the slip ring and the sliding contacts may be affected. But even electric motors without slip rings can become inoperable due to wear. Among the mechanical components, the bearings of the motor shaft may be affected.

The extent of wear depends, for example, on the operating conditions of the electric motor. If, for example, the electric motor is operated at excessively high or excessively low temperatures, the bearing grease can no longer optimally lubricate and the bearing will fail more quickly. Strong vibrations can also shorten the service life of the bearing, since the bearings must dissipate additional forces due to the vibrations. This results in the need to know physical variables that have an influence on the operating parameters of an electric motor. With knowledge of the relevant physical variables, operation of the electric motor that makes it prone to wear can then be recognized or, if a failure has already occurred, a replacement motor can be selected that is suitable for the expected operating parameters.

It is known from practice to attach sensors to the housing of an electric motor which allow conclusions to be drawn about the operating parameters of the electric motor. For example, temperature and vibrations are measured in this case. Furthermore, the operating behavior of the motor can be inferred from various parameters of the feed signal of the electric motor, for example the voltage ripple or the current intensity.

Consequently, the preservation and storage of the operating parameter data that can be determined is important in order to analyze and evaluate these collected operating data for optimization purposes or for troubleshooting.

Continuous data acquisition, however, requires a considerable amount of memory, which is usually neither available nor feasible in the fan hardware. A gateway to be provided in the motor system could therefore be used to create a possibility of directly forwarding recorded operating parameter data to a central evaluation system. However, this is cumbersome and requires a permanent connection of the gateway to central, higher-level computing systems which can receive and process the enormous amounts of data. Furthermore, the transmission of considerable amounts of data required is inefficient and disadvantageous.

On the basis of the model version known from practice with regard to fans, there is, therefore, no meaningful recording of operating parameter data for standard series devices; and, with regard to customer operation, there is no operating data that would allow optimization potential and/or a determination/identification of the causes of failure of a motor system.

The present disclosure is therefore based on the object of designing and developing a method for acquiring operating parameter data of a motor system of the aforementioned type, comprising an electric motor, in such a way that improved and/or more efficient acquisition and storage of operating parameter data is possible, for example, directly in/on the motor system. Furthermore, a corresponding motor system and a corresponding fan are to be specified.

The object is achieved according to this disclosure by the features of claim 1. According to this, a method is specified for acquiring operating parameter data of a motor system with an electric motor, for example, for a fan, with states of operating parameters being recorded during operation of the motor system, with the operating parameters including a basic parameter and at least one additional parameter, wherein, based on a state detection of the basic parameter, state-change events of the basic parameter are determined, with a state of the additional parameter being recorded when a state-change event of the basic parameter is detected, and wherein the recorded state of the additional parameter is stored linked to the detected state-change event.

The above object is also achieved by the features of claim 16. Accordingly, a motor system for the acquisition of operating parameter data is specified, the motor system comprising the following:

an electric motor with a stator and a rotor rotatable relative to the stator, and a control system with a processor and a memory, the control system being configured in such a way that states of operating parameters are recorded during operation of the motor system, the operating parameters including a basic parameter and at least one additional parameter, wherein the control system is further configured in such a way that, based on a state detection of the basic parameter, state-change events of the basic parameter are determined, that when a state-change event of the basic parameter is detected, a state of the additional parameter is recorded, and that the recorded state of the additional parameter is stored in the memory linked to the detected state-change event.

Finally, the above object is achieved by a fan with the features of claim 17. Accordingly, the fan comprises a motor system according to claim 16.

In the manner according to this disclosure, it was initially recognized that it is of considerable advantage if the operating parameter data of a motor system which are required for later analyses and evaluations are reduced during the data acquisition to the extent possible. In a manner further in accordance with this disclosure, it has been recognized that a selection method can be implemented to reduce the amount of data to be stored, on the basis of which it is determined whether or not the current operating point should be evaluated or stored. In order to acquire operating parameter data of the motor system, states of operating parameters are therefore recorded during operation. The operating parameters in this case include a basic parameter and at least one additional parameter. According to this disclosure, predeterminable state-change events of the basic parameter are determined based on a state recording of the basic parameter. According to this disclosure, when a predeterminable state-change event of the basic parameter is detected, a state of the additional parameter is recorded, for example, that which is prevailing at the time of detection of the state-change event. The recorded state of the additional parameter is then stored linked to the detected state-change event.

Consequently, with the method according to this disclosure for acquiring operating parameter data of a motor system and with the motor system according to this disclosure and with the fan according to this disclosure, improved and/or more efficient acquisition and storage of operating parameter data is made possible in the motor system. This disclosure is thus based on the idea of recording relevant operating points of the motor system, for example, with regard to relevant components of the motor system, in a memory-efficient manner, so that operating data are available for analyses based thereon in the event of damage (finding the cause) or so that the operating parameter data can be used, as a long-term database, for the systematic development and optimization of the motor system and/or its components. In an advantageous manner, a control device or a control system with memory functionality is provided in the motor system or in the electric motors used.

At this point, it should be noted that a "predeterminable state-change event" to be determined—within the scope of the claims and within the scope of the description—can be understood as a specific or defined state-change event in which the state of an operating parameter changes in a significant way. It is conceivable that the predeterminable state-change event is established—rigidly or not rigidly—in advance of the motor operation. Furthermore, it is conceivable that a predetermined state-change event can be understood to mean a state-change event that can be created and/or configured independently by the motor system during a learning phase of the motor system in customer operation and/or during ongoing operation of the motor system. It is thus conceivable that, within the scope of an advantageous embodiment, the predeterminable state-change event is not rigidly specified or predefined, but rather can be configured during operation by a learning motor system.

It should also be pointed out that the "recording" or "acquiring" of a state of an operating parameter—within the scope of the claims and within the scope of the description—is to be understood as a state recording in the broadest sense. In this way, the state can be obtained on the basis of measurements. It is also conceivable that the state of an operating parameter is calculated, for example, on the basis of operation-specific simulations. A combined use of simulation data and real measurement data can also be possible. The expression "recorded state" of an operating parameter (basic parameters and/or additional parameters) can thus be understood to mean that the state is recorded by measuring and/or by calculating.

The "operating parameters of an electric motor of a motor system" can include various pieces of information that characterize the operating conditions of the electric motor or the motor system. Such operating parameters can be, for example, the operating temperature, the temperature of the bearing, vibration stress, the orientation of the electric motor, the rotational speed, or the humidity. This short list, which is not to be regarded as final, shows what the operating parameters of the electric motor can be. In principle, anything that directly or indirectly influences the service life of an electric motor or a motor system can be such an operating parameter. The physical variable recorded with a sensor, which is representative of the respective operating parameter, can also be correspondingly diverse. An operating parameter or its state recording can thus be determined on the basis of one or more measured—physical—variables. Furthermore, it is conceivable that an operating parameter or its state recording takes place on the basis of data that are obtained by internal processing or by simulation and/or possibly recorded by calculations.

In order to store acquired operating parameter data in or on the motor system, the electronics of the motor system can have a memory which is configured to store recorded states of the operating parameters. In order to avoid data loss in the event of a power supply failure, the memory can be configured as a non-volatile memory. Such a non-volatile memory can be, for example, a flash memory, an EEPROM (Electronically Erasable Programmable Read-Only Memory), an NVRAM (Non-volatile Random Access Memory), or another semiconductor memory.

In an advantageous manner, a predeterminable classification can be used as the basis for the state recording of an operating parameter, with a recorded state of the operating parameter being assigned to a predefined class of the classification. A suitable counting method can thus be implemented which allows the states of the operating parameters to be monitored to be recorded and stored efficiently. A class can, for example, correspond to a predefined operating parameter range. Accordingly, a range-wise division of an operating parameter in a defined operating parameter range can be referred to as a class. Expediently, for counting state-change events, the measuring range of the operating parameters can be divided into classes of the same size, so that the classification is defined equidistantly by an operating parameter. Furthermore, it is also conceivable that the classification is defined non-linearly by an operating parameter.

At this point it should be noted that the predetermined classification—and thus the classes given by the classification—can be defined in advance of the motor operation, so that a predefined classification is provided. Furthermore, it is conceivable that the classification—and thus the classes specified by the classification—is or are created and/or configured for an operating parameter during operation of the motor system and/or in a learning phase of the motor system, possibly individually.

In a further advantageous manner, when the state-change event of the basic parameter is detected, a state of one or more further additional parameters prevailing at the time of detection of the state-change event can be recorded, with the recorded state of the further additional parameter or the recorded states of the further additional parameters also being stored linked to the detected state-change event. As a result, further operating parameter data can be efficiently preserved and/or stored in relation to the respectively detected state-change event.

In an advantageous embodiment, it can be provided that the detected state-change event of the basic parameter and the recorded state of the additional parameter are stored as a state combination. It is also conceivable that, when several additional parameters are taken into account, the recorded states of the additional parameters and the detected state-change event are stored as a state combination. This means that the detected state-change event and the recorded state of the additional parameter and possibly the recorded state of the further additional parameter or the recorded states of the further additional parameters can be stored as a state combination. Consequently, a memory-efficient acquisition of operating parameter data is possible, in which a linked consideration of several operating parameters can take place. When two or more operating parameters are considered, a storage of determined operating states of the operating parameters can be implemented, with the parallel prevailing state of at least one further operating parameter being detected and stored as an additional parameter during operation of the motor system, as a function of the change in a first operating parameter as the basic parameter. Thus, data acquisition and storage of operating data on the motor system can take place in a sophisticated way, namely by use of intelligent compression based on the selection of a specific data volume.

The state combination can therefore advantageously be stored as a function of the change in the basic parameter. As a result, a memory-efficient method can be provided, with relevant operating states of the motor system being recorded in the form of the state combination as a result of detected state-change events, and a measure for storing the state combination is initiated or carried out as a function of the detected characteristic state change of the basic parameter.

With regard to efficient storage of recorded or calculated operating parameter data, it is conceivable that the detected state-change event is stored by the state combination in such a way that the starting state and target state of the state change of the detected state-change event of the basic parameter are stored in the state combination. The state before the characteristic state change and the state after the characteristic state change are thus stored as the starting and target state of the state-change event of the basic parameter.

In an advantageous manner, state combinations that are generated on the basis of detected state-change events during operation can be stored in a matrix. The matrix includes matrix elements that are addressable via the columns and rows of the matrix. In a further advantageous manner, the matrix can be implemented as a multi-dimensional matrix or as a nested matrix, with further sub-elements in turn being stored in a matrix element. The sub-elements can include scalars, vectors, and/or matrices.

Furthermore, it is conceivable that the state combinations are stored in the matrix in such a way that a distribution of the detected state-change events of the basic parameter can be obtained. The respective state changes of the state-change events of the basic parameter are thus available for a subsequent operating data analysis.

With regard to efficient storage of the recorded or determined operating states, the state combinations can be stored in the matrix in such a way that the starting states and target states of the state-change events are mapped via indices of the matrix, for example, column indices and row indices of the matrix. Information regarding the number of state events can expediently be stored in the matrix elements of the matrix. A simple and efficient storage of the recorded operating states is thus realized.

In an advantageous manner, information about the recorded states of additional parameters can be stored in the matrix elements of the matrix. The matrix can be a nested matrix with matrix elements, the matrix elements in turn being able to include vectors and/or one or more matrices. Various pieces of information about additional parameters, for example, the recorded states of the additional parameters, can thus be stored or saved in the nested matrix in an efficient manner.

With regard to a suitable collection of relevant operating parameter data, the state of the basic parameter determined by the state recording of the basic parameter can be subjected to an evaluation/analysis in predetermined or predefined evaluation intervals in order to detect a state-change event of the basic parameter. Thus, the detection of state-change events is implemented in an efficient manner. A state-change event can represent a predefined state change of the basic parameter.

The evaluation can advantageously be implemented in such a way that when a predetermined change threshold, for example, a state-change threshold, is exceeded, a state-change event of the basic parameter is determined. Thus, by choosing a suitable change threshold, it can be established which state changes should be taken into account as characteristic state changes with regard to the acquisition and storage of operating parameter data.

The operating parameters can advantageously include a rotational speed parameter, a temperature parameter, a current parameter, and/or a voltage parameter, etc. Operating parameters of the motor system and/or of the electric motor, which are important for any subsequent analysis and/or optimization of the motor system, can thus be taken into account and stored. Operating parameters can thus include information about rotational speed, temperature, current, voltage, etc. Furthermore, gradients or other mathematical derivatives derived therefrom are also conceivable.

With regard to the acquisition and storage of meaningful operating parameter data, it is conceivable that a rotational speed parameter is used as the basic parameter. A temperature parameter and/or a current parameter could be taken into account and recorded in a suitable manner as additional parameters. Saving the operating parameter data as a basic parameter, as a function of the rotational speed parameter, can result in the following advantages, for example:

Detailed knowledge regarding an operating mode change in a motor system

A systematic analysis of customer operating parameters is made possible

A data analysis to determine the correlation between the operating mode and damage pattern is made possible A consideration of cold starts when estimating the service life Furthermore, with regard to the acquisition and storage of meaningful operating parameter data, it is conceivable that a voltage parameter is used as the basic parameter.

There are various options for advantageously designing and refining the teaching of the present disclosure. For this purpose, reference is made, on the one hand, to the claims subordinate to claim 1 and, on the other hand, to the following explanation of exemplary embodiments of this disclosure with reference to the figures. In connection with the explanation of the exemplary embodiments of this disclosure with reference to the drawing, designs and refinements of the teaching are also explained.

Figure 1:
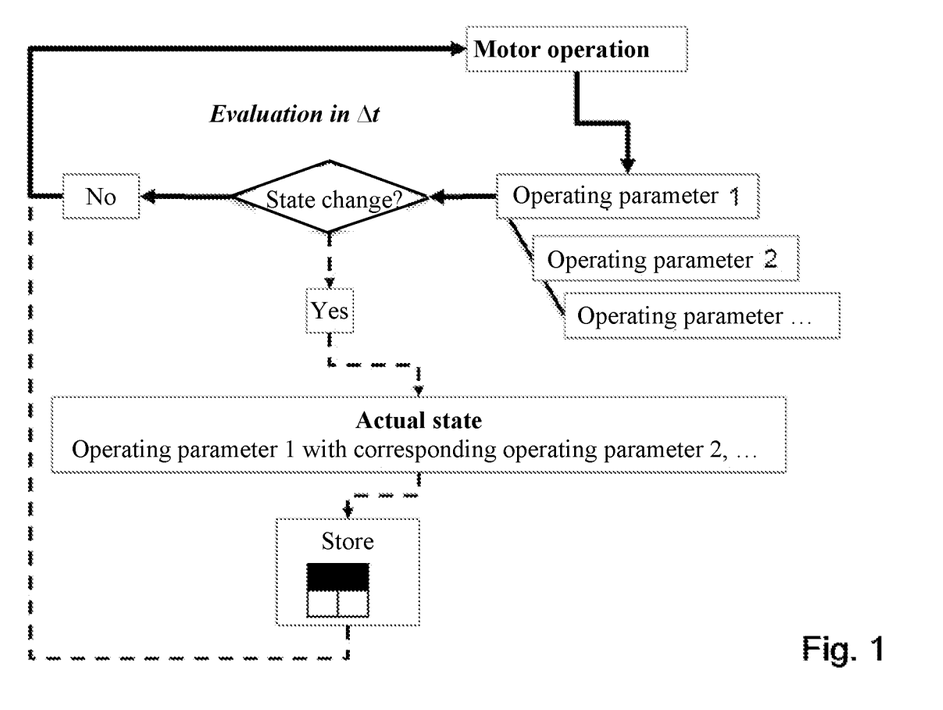
FIG. 1 a schematic view of a block diagram of a method for acquiring operating parameter data of a motor system according to an exemplary embodiment of this disclosure.

FIG. 1 shows a schematic view of a block diagram of a method for acquiring operating parameter data of a motor system according to an exemplary embodiment of this disclosure. FIG. 1 shows the principle of a method according to an exemplary embodiment which can be applied, for example, to an external rotor motor of a motor system and/or a fan. During operation of the motor system and/or the fan, namely during motor operation, predefined state-change events of the operating parameter 1 are determined, as the basic parameter, based on a state recording of operating parameter 1. This means that, during motor operation, the state of operating parameter 1 is recorded over time, the state of operating parameter 1 determined in the predetermined evaluation intervals Δt being subjected to an evaluation so that predefined and/or characteristic state changes of operating parameter 1 are detected. If no characteristic state change of operating parameter 1 is found in the course of the evaluation, motor operation is continued unchanged. If a characteristic state change is detected, a memory function is triggered. Characteristic state changes are thus detected via operating parameters associated therewith during operation of the motor system of the fan, and a memory function is triggered if necessary. The storage function is then configured in such a way that the state change of operating parameter 1 is stored as a state combination together with the associated state of operating parameter 2 and, if applicable, states of further operating parameters. A corresponding memory can be available for this in the motor system and/or in the fan. Motor operation is continued continuously. As a result, relevant state combinations, which represent relevant operating parameter states, can be detected and stored as a function of a state change of a basic parameter, which is operating parameter 1 in this case.

Figure 2:
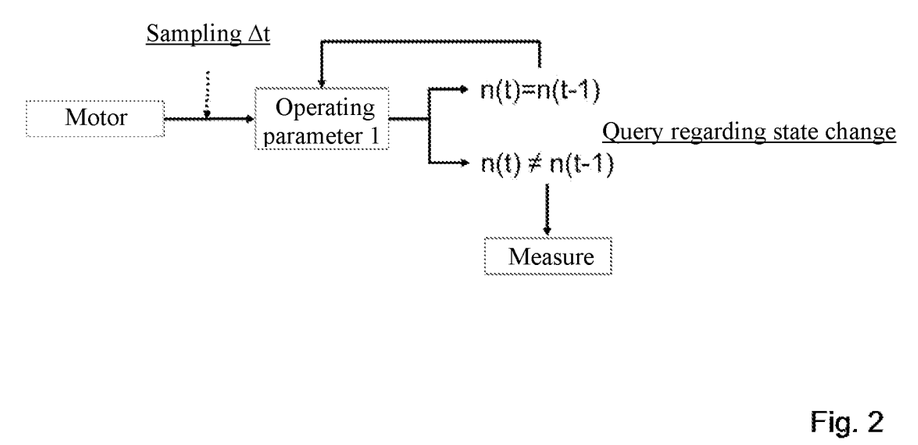
FIG. 2 a schematic view of an algorithm for detecting a state-change event for a method for acquiring operating parameter data of a motor system according to an exemplary embodiment of this disclosure.

FIG. 2 shows, in a schematic view, an algorithm for detecting a state-change event for a method for acquiring operating parameter data of a motor system according to an exemplary embodiment of this disclosure. FIG. 2 illustrates, by way of example, an algorithm on which the method is based, which can be used to detect a characteristic state change of the basic parameter. During motor operation, the basic parameters of the motor system are sampled in predefined evaluation intervals. The sampled state n(t) of the basic parameter at sampling time t is continually compared with the previous state n(t−1) of the basic parameter at sampling time t−1 in order to detect a state-change event based on a characteristic state change. If a state change is detected, a measure for storing the detected state-change event is triggered, with the state of at least one additional parameter being stored, which is the state prevailing at the time of detection, in addition to the detected characteristic state change.

The change in an operating parameter functioning as a basic parameter is thus analyzed at defined evaluation intervals during operation. The motor system operating state associated with the state-change event is characterized by the extent of the quantitative change in the basic parameter, i.e. the state change of the basic parameter, and by the states of at least one additional parameter present during the state-change event.

FIG. 3a and FIG. 3b each show a diagram for the exemplary illustration of states of an operating parameter determined over time. The x-axes in FIG. 3a and/or in FIG. 3b each represent the reference variable, for example the time at which the states of operating parameter 1 and operating parameter 2 are related. Instead of time, variables such as current, power, or temperature, and/or combinations of these variables could also be used as reference variables. The y-axis in FIG. 3a and/or in FIG. 3b represents the possible states of operating parameter 1 and/or operating parameter 2, the value range of operating parameters 1 and 2 being divided into classes 1 to 10.

Operating parameter 1 serves as the basic parameter, the curve of the basic parameter shown in FIG. 3a representing an exemplary curve of a rotational speed parameter. In the evaluation interval Δt illustrated by dashed lines in FIG. 3a, a state-change event can be seen in which a rotational speed jump from class 4 to class 2 takes place.

Figure 3:
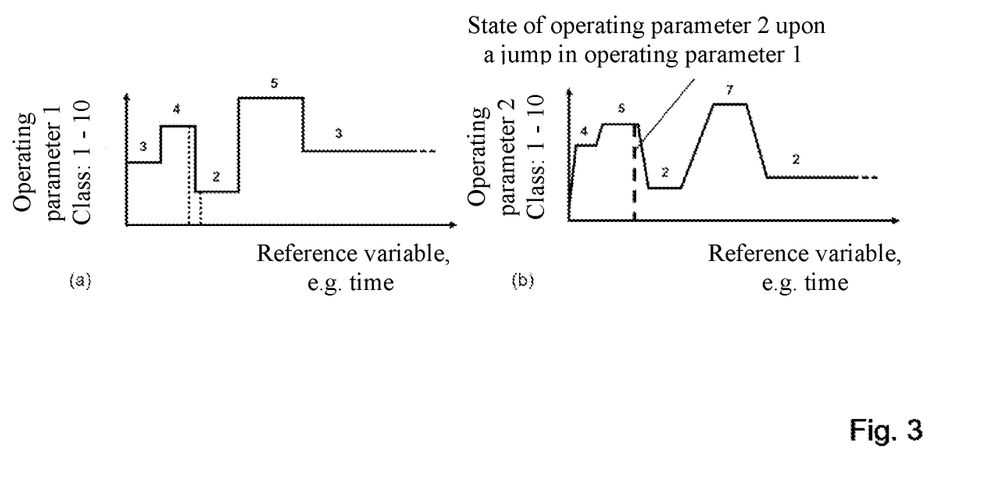
FIG. 3a a diagram for an exemplary illustration of the states of an operating parameter determined over time.
FIG. 3b a diagram for an exemplary illustration of the states of a further operating parameter determined over time.

Operating parameter 2 serves as an additional parameter, the curve of the additional parameter shown in FIG. 3b representing an exemplary curve of a temperature parameter. The time of detection of the state-change event of the basic parameter is illustrated in the diagram according to FIG. 3b with a dashed vertical line. The state of the additional parameter prevailing at the time of detection of the state-change event is thus assigned to class 5 in FIG. 3b. Thus, FIG. 3 illustrates a rotational speed jump occurring in the evaluation interval Δt as a state-change event, the rotational speed parameter jumping from state class 4 to state class 2. At the time of the state-change event, the temperature parameter functioning as an additional parameter is recorded with state class 5.

Figure 4:
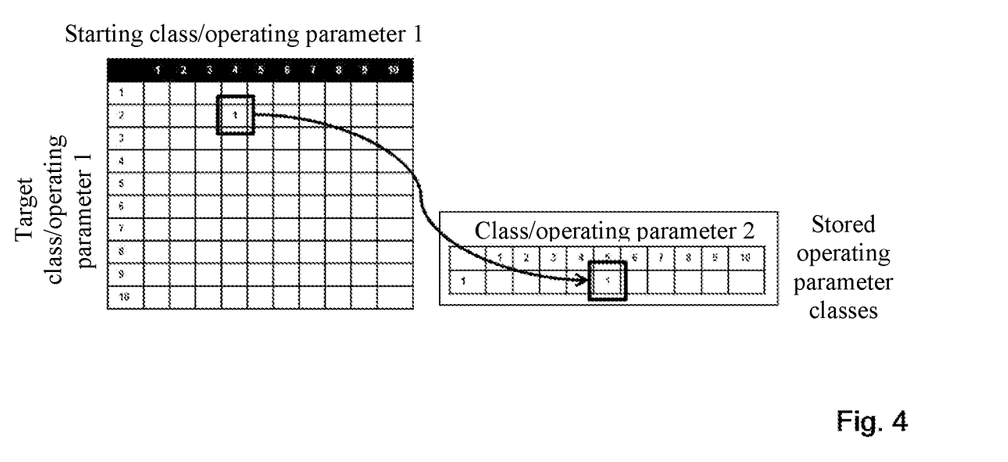
FIG. 4 a schematic view of an exemplary storage of determined states of operating parameters as a state combination in a nested matrix according to an exemplary embodiment of this disclosure.

FIG. 4 shows, in a schematic view, an exemplary storage of determined states of operating parameters as a state combination in a nested matrix according to an exemplary embodiment of this disclosure. FIG. 4 illustrates the storage of operating parameter data using the exemplary curves of operating parameter 1 and operating parameter 2 according to FIG. 3, the storage of data taking place by storing the recorded operating states in the form of defined classes in a nested matrix. A class is a division of operating parameters into a defined operating parameter value range. The classification of the operating parameters can be defined as equidistant or non-linear. After the state change of operating parameter 1, the detected state-change event is stored in the main matrix in such a way that the starting and target class, i.e. the state of operating parameter 1, can be verified as the basic parameter, before and after the state change. The number of entries in a matrix element describes the number of state-change events characterized by the classification of operating parameter 1 as the basic parameter.

In addition to the stored state change of the state-change event (from class to class), i.e. the state change of operating parameter 1 as the basic parameter, information about further operating parameters, namely the additional parameters, is also stored in an implemented program code, which is linked to the event of the state change of the basic parameter. Thus, for example, there can be storage as operating parameter data that a rotational speed jump from class 4 to class 2 has occurred for the basic parameter (operating parameter 1) and that a temperature of class 5 was present for the additional parameter (operating parameter 2) when the rotational speed jump occurred.

Figure 5:
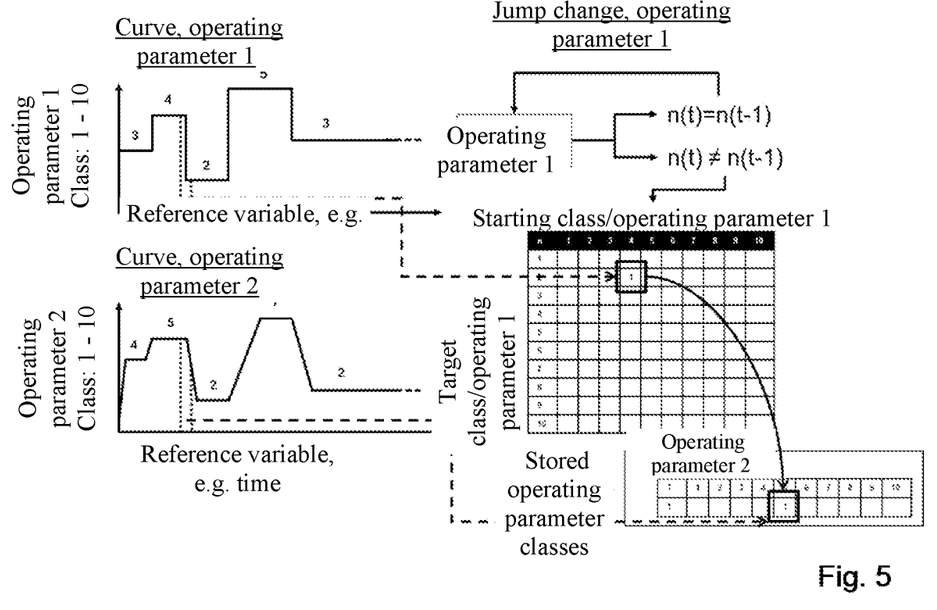
FIG. 5 a schematic view of stages of a method according to an exemplary embodiment of this disclosure.

FIG. 5 illustrates individual stages of a method according to an exemplary embodiment of this disclosure in an overview. Operating parameter data of a motor system are acquired, with states of operating parameters 1 and 2 being recorded during operation of the motor system. Operating parameter 1 represents a basic parameter, and operating parameter 2 represents an additional parameter. Based on a state recording of operating parameter 1 functioning as the basic parameter, predefined state-change events of operating parameter 1 are determined. When a state-change event of operating parameter 1 is detected, a state of operating parameter 2 functioning as an additional parameter is recorded—the state being that prevailing at the time of detection of the state-change event. The recorded state of operating parameter 2 is linked to the detected state-change event and stored in a nested matrix.

The detected state-change event and the recorded state of the additional parameter are stored in the matrix as a state combination. The state combination is stored in the matrix in such a way that the starting state and the target state of the detected state-change event are depicted via columns and rows of the matrix. Information on the number of detected state events is stored in the matrix elements of the main matrix. Furthermore, information regarding the recorded states of the additional parameter, namely operating parameter 2, is stored in the matrix elements. Specifically, according to the example shown in FIG. 5, the characteristic state change of operating parameter 1 from starting class 4 to target class 2 is stored in the main matrix. The state of the additional parameter prevailing at the time of detection of the state-change event is also stored in the corresponding matrix element, namely class 5 for operating parameter 2 functioning as an additional parameter.

In order to reduce the amount of data to be stored, a selection method is implemented which is used to determine whether or not the current operating point should be evaluated or stored. Consequently, a memory-efficient acquisition of operating parameter data is realized.

With regard to further advantageous embodiments of the method according to this disclosure, reference is made to the general part of the description and to the appended claims in order to avoid repetition.

Finally, it is to be expressly noted that the above-described exemplary embodiments of the method according to this disclosure and the motor system according to this disclosure as well as the fan according to this disclosure are used solely to explain the claimed teaching, but do not limit it to the exemplary embodiments.

The invention claimed is:

1. A method of acquiring operating parameter data of a motor system having an electric motor, the method comprising:
    recording states of operating parameters during operation of the motor system, wherein the operating parameters include a basic parameter and at least one additional parameter;
    determining a state-change event of the basic parameter based on a recorded state of the basic parameter;
    recording a state of the additional parameter upon detection of the state-change event of the basic parameter;
    linking the recorded state of the additional parameter to the detected state-change event;
    storing the recorded state of the additional parameter linked to the detected state-change event;
    storing the detected state-change event, the recorded state of the additional parameter, and optionally the recorded state of one or more further additional parameters as a state combination,
    wherein the state combination is stored as a nested matrix having matrix element, and wherein the state combination includes a starting state and a target state of the state change of the detected state-change event of the basic parameter, wherein the state combination is stored in the matrix such that the starting state and the target state are depicted via indices of the matrix, and wherein information regarding the number of state events can be stored in the matrix elements of the matrix.

2. The method of claim 1, wherein the recorded state of an operating parameter is based on a classification, and the recorded state of the operating parameter is assigned to a class of the classification.

3. The method of claim 1, wherein a state of one or more further additional parameters is recorded when the state-change event of the basic parameter is detected, and one or more recorded states of the at least one additional parameter are stored and linked to the detected state-change event.

4. The method of claim 1, wherein the state combination is stored as a function of the state-change of the basic parameter.

5. The method of claim 1, wherein the state combination stores a starting state and a target state of a state change of the detected state-change event.

6. The method of claim 1, wherein the state combination is stored in the matrix such that a distribution of the detected state-change events of the basic parameter can be obtained.

7. The method of claim 1, wherein the starting states are depicted via at least one of column indices and row indices of the matrix, and the target states are depicted via at least one of column indices and row indices of the matrix.

8. The method of claim 1, wherein information about the recorded states of the additional parameters is stored in the matrix elements of the matrix.

9. The method of claim 1, wherein the state-change event of the basic parameter based on the recorded state of the basic parameter is detected by evaluating pre-definable evaluation intervals.

10. The method of claim 9, wherein the state-change event of the basic parameter is determined when a pre-definable change threshold is exceeded.

11. The method of claim 1, where the operating parameters comprise parameters selected from the group consisting of a rotational speed parameter, a temperature parameter, a current parameter, and a voltage parameter.

12. The method of claim 1, wherein the basic parameter comprises a rotational speed parameter.

13. The method of claim 1, wherein the basic parameter comprises a voltage parameter.

14. A motor system for acquiring operating parameter data according to the method of claim 1, the motor system comprising a control unit having a processor and a memory, the control unit configured to:
- record the states of the operating parameters during operation of the motor system;
- determine the state-change events of the basic parameter based on the recorded state of the basic parameter;
- record the state of the additional parameter upon detection of the state-change event of the basic parameter;
- link the recorded state of the additional parameter to the detected state-change event; and
- store the recorded state of the additional parameter linked to the detected state-change event, wherein electric motor comprises a stator and a rotor rotatable relative to the stator.

15. A fan comprising the motor system of claim 14.

* * * * *